(12) United States Patent  
Krupa

(10) Patent No.: US 8,561,823 B1
(45) Date of Patent: Oct. 22, 2013

(54) FOOD SERVICE CONTAINER

(75) Inventor: Calvin S. Krupa, Rockford, MN (US)

(73) Assignee: Ultra Green Packaging, Inc., Plymouth, MN (US)

( * ) Notice: Subject to any disclaimer, the term of this patent is extended or adjusted under 35 U.S.C. 154(b) by 0 days.

(21) Appl. No.: 13/495,838

(22) Filed: Jun. 13, 2012

(51) Int. Cl.
*B65D 21/032* (2006.01)

(52) U.S. Cl.
USPC .......... 220/4.21; 220/4.24; 206/515; 206/519

(58) Field of Classification Search
USPC ................ 220/4.21, 4.24; 206/503, 515, 519
See application file for complete search history.

(56) References Cited

U.S. PATENT DOCUMENTS

| | | |
|---|---|---|
| 3,381,876 A | 5/1968 | Biggins |
| 3,442,420 A | 5/1969 | Edwards |
| 3,617,104 A | 11/1971 | Stadig |
| 3,784,052 A | 1/1974 | Edwards |
| 3,952,903 A | 4/1976 | Sanders et al. |
| 4,018,338 A | 4/1977 | Lemkin |
| 4,098,453 A | 7/1978 | Arneson |
| 4,127,189 A | 11/1978 | Shumrak et al. |
| 4,280,648 A | 7/1981 | Boursier |
| 4,337,116 A | 6/1982 | Foster et al. |
| D265,711 S | 8/1982 | Dunden |
| D283,666 S | 5/1986 | Holzkopf |
| D292,379 S | 10/1987 | Pollitt |
| 4,697,703 A | 10/1987 | Will |
| 4,974,738 A * | 12/1990 | Kidd et al. ............... 220/4.24 |
| D324,651 S | 3/1992 | Kaneko |
| 5,094,355 A | 3/1992 | Clark et al. |
| 5,105,947 A * | 4/1992 | Wise ............................ 206/519 |
| 5,203,491 A | 4/1993 | Marx et al. |
| 5,234,159 A | 8/1993 | Lorence et al. |
| 5,347,753 A | 9/1994 | Dall |
| D353,327 S | 12/1994 | Castner et al. |
| 5,423,477 A | 6/1995 | Valdman et al. |
| 5,593,054 A | 1/1997 | Glynn |
| 5,662,237 A | 9/1997 | Cain |
| D391,850 S | 3/1998 | Krupa et al. |
| D395,003 S | 6/1998 | Daniels |
| D395,796 S | 7/1998 | Krupa et al. |
| D398,524 S | 9/1998 | Waterhouse |
| D414,409 S | 9/1999 | Sanfilippo et al. |
| D427,902 S | 7/2000 | Hayes et al. |
| D429,147 S | 8/2000 | Baker et al. |
| D432,409 S | 10/2000 | Feldmeier |
| 6,196,404 B1 | 3/2001 | Chen |

(Continued)

FOREIGN PATENT DOCUMENTS

| | | |
|---|---|---|
| GB | 2449507 | 11/2008 |
| JP | 2000129136 | 5/2000 |
| WO | WO 03/044279 | 5/2003 |
| WO | WO2008035082 | 3/2008 |

*Primary Examiner* — Stephen Castellano
(74) *Attorney, Agent, or Firm* — Thomas J. Nikolai; Nikolai & Mersereau, P.A.

(57) ABSTRACT

Stackable trays for food items are made from fibrous plant material, the source of which may be any fibrous plant or combination of fibrous plants, such as bamboo, wheat straw, bagasse or recycled paper or other paper products. Each tray includes a plurality of locking beads which define recesses. The locking beads and recesses of adjacent identical trays mate with each other when the trays are stacked. Likewise, the locking beads and recesses of two identical trays employed to provide a food container mate with each other to secure the two trays together in a food containment configuration.

13 Claims, 5 Drawing Sheets

(56) References Cited

U.S. PATENT DOCUMENTS

| | | |
|---|---|---|
| D444,058 S | 6/2001 | Hampshire et al. |
| 6,257,434 B1 | 7/2001 | Lizzio |
| D450,240 S | 11/2001 | Haag et al. |
| D456,247 S | 4/2002 | Castellanos et al. |
| 6,376,583 B1 | 4/2002 | Winkler et al. |
| D462,901 S | 9/2002 | Giard, Jr. et al. |
| 6,554,147 B1 | 4/2003 | Maida, Jr. et al. |
| 6,639,199 B1 | 10/2003 | Ross, Jr. |
| 6,748,722 B2 | 6/2004 | Correll |
| 6,753,073 B2 | 6/2004 | Lin |
| D504,326 S | 4/2005 | Vovan |
| 7,032,773 B2 * | 4/2006 | Dees et al. .................. 220/4.24 |
| 7,048,975 B1 | 5/2006 | Tojo et al. |
| 7,097,066 B2 | 8/2006 | Tucker et al. |
| 7,124,910 B2 | 10/2006 | Nordland |
| D551,091 S | 9/2007 | Shahsavarani |
| D553,012 S | 10/2007 | Changpan |
| D572,149 S | 7/2008 | Mangino et al. |
| D576,449 S | 9/2008 | Boudewijns |
| D581,781 S | 12/2008 | Enriquez |
| D584,108 S | 1/2009 | Olsson |
| D587,568 S | 3/2009 | Shields |
| D591,173 S | 4/2009 | Church |
| D594,324 S | 6/2009 | Calacitti |
| D594,326 S | 6/2009 | Colatti |
| D598,742 S | 8/2009 | Arevalo et al. |
| 7,726,483 B2 | 6/2010 | Ramanujam et al. |
| D625,994 S | 10/2010 | Krupa |
| D627,635 S | 11/2010 | Krupa |
| 7,882,974 B2 * | 2/2011 | Evans et al. .................. 220/4.24 |
| D649,448 S | 11/2011 | Wu |
| 8,056,751 B2 | 11/2011 | Vovan |
| 2001/0040016 A1 | 11/2001 | Kumamoto et al. |
| 2002/0096450 A1 | 7/2002 | Garst |
| 2002/0175164 A1 * | 11/2002 | Dees et al. .................. 220/4.24 |
| 2005/0121163 A1 | 6/2005 | Renck et al. |
| 2005/0150624 A1 | 7/2005 | Toh et al. |
| 2006/0048909 A1 | 3/2006 | Yeh et al. |
| 2006/0054292 A1 | 3/2006 | Yeh et al. |
| 2007/0295631 A1 | 12/2007 | Lin et al. |
| 2008/0237228 A1 * | 10/2008 | Chou .......................... 220/4.24 |
| 2009/0057381 A1 | 3/2009 | Gokhale |
| 2010/0044267 A1 | 2/2010 | Tolibas-Spurlock et al. |
| 2010/0051498 A1 | 3/2010 | Tsai |
| 2010/0170824 A1 | 7/2010 | Ramanujam et al. |
| 2010/0236966 A1 | 9/2010 | Luttik et al. |

* cited by examiner

FOOD SERVICE CONTAINER

BACKGROUND OF THE INVENTION

I. Field of the Invention

The present invention relates to food service containers. More specifically, the present invention relates to food service trays. Two such trays may be used as to form a food containment enclosure or container. The base and cover each have an identical construction and molded from natural or recycled materials which are compostable, biodegradable and environmentally friendly.

II. Description of the Prior Art

Various types of containers are used by food distributors, grocers and restaurants to package food. All such packages, however, suffer from one or more deficiencies making them less than ideal for use. Such containers are often made from aluminum, glass or plastic. Sometimes paper products are employed. However, such paper products are often coated with materials designed to make the package more durable and fluid resistant. They also have the effect of making such packaging slower to biodegrade and more difficult to effectively recycle. Packages commonly used today are a major source of litter and a major source of trash filling America's dumps and landfills.

Aluminum, glass and plastic are often employed to construct packaging because they are easily formed into a desired shape. However, such packages are expensive to manufacture, particularly those made from plastics derived from oil.

Paper and cardboard packages are not so easy to mold and typically require the use of adhesives, inks and coatings which increase cost and exacerbate environmental issues.

SUMMARY OF THE INVENTION

Containers made in accordance with the present invention are low cost, made from readily renewable or recycled resources, do not require the use of adhesives and are quickly biodegradable and compostable. Such containers may be used for cooking and heating food items either in a microwave oven or a conventional oven at temperatures up to 425° F. Thus, the containers made in accordance with the present invention are superior in many important respects to the containers of the prior art.

Containers made in accordance with the present invention are made of fibrous plant materials, such as bamboo, wheat straw, bagasse or the like. Paper, such as recycled paper, may also be employed. These new materials are formed into a slurry which is then subjected to a molding and cooking process. The cooking and molding process is carried out at high temperatures (in the 350° F. range) and at high pressure (15 to 20 tones per square inch) to drive out the moisture from the slurry and form the fibers into a suitable shape. Various plant based starch materials may be added in low concentrations (less than 1%) to make the container more oil and moisture resistant. Other additives may also be employed for this purpose.

To reduce manufacturing and inventory costs, the containers comprise two identical trays. Each tray may be used as a serving tray. Two such trays serve as the base and cover of the container. The trays are designed such that a series of trays may be conveniently stacked for storage. The trays are also provided with cooperating locking features such that two may be joined together in a secure fashion to enclose a food storage chamber. No adhesives, separate wrap, separate clamp or separate binder are required to secure the base and cover together.

More specifically, the food service containers have a stacked configuration and a food containment configuration because each includes a first stackable member and a second stackable member identical to the first stackable member. The first and second stackable members each have a substantially flat base. A continuous sidewall projects from the base and forms with the base a food storage area. A continuous locking ledge projects outwardly from the continuous sidewalls. To make unstacking of the stackable members easier, a plurality of recesses are provided in the continuous sidewall extending from the continuous locking ledge toward the base.

A number of locking features are associated with the locking ledge. A first locking bead projects in a direction away from the top of the continuous locking ledge. The first locking bead defines a hollow open bottom recess accessible from the bottom of the continuous locking ledge. A second locking bead projects in a direction away from the bottom of the continuous locking ledge. The second bead defines a hollow open top recess accessible from the top of the continuous locking ledge. The first and second locking beads each comprise a pair of walls and a cap. The walls of each of the pair are separated from each other and extend between the continuous locking ledge and the cap. Also, the draft of each wall of the pair is preferably ten degrees less or most preferably less than about five degrees. The locking ledge also includes first and second ear portions. A portion of the first locking bead projects in a direction away from the top of the first ear portion and a portion of the second locking bead projects in a direction away from the bottom of the second ear portion. One of the ear portions may also include a locking tab within the other ear portion including a locking recess.

The various features of the stackable members are shaped and sized such that when the first and second stackable members are in a stacked configuration, the base of the second stackable member is with the food storage area of the first stackable member, the first locking bead of the first stackable member is mated with the hollow open bottom recess of the second stackable member and the open top recess of the first stackable member is mated with the second locking bead of the second stackable member.

Further, when the first and second stackable members are in the food containment configuration, the bases and sidewalls of the stackable members cooperate to form a food containment chamber.

In the food containment configuration, the first locking bead of the first stackable member is mated with the hollow open top recess of the second stackable member and the hollow open top recess of the first stackable member is mated with the first locking bead of the second stackable member. Friction between the bead surfaces in face-to-face registration with the recess surfaces is typically sufficient to keep the first and second stackable members in the food containment configuration. The ears particularly when the ears are provided with additional locking tabs and locking recesses which mate with each other provide additional locking power to hold the stackable members in the food containment configuration.

DETAILED DESCRIPTION

Figure 1:
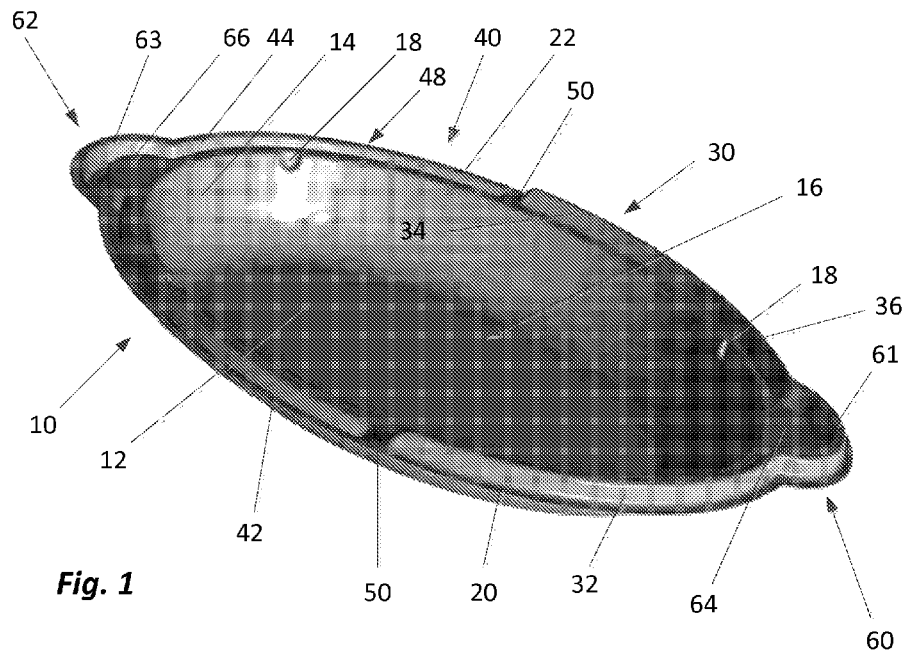
FIG. 1 is a perspective view of a stackable member made in accordance with the present invention.
Figure 2:
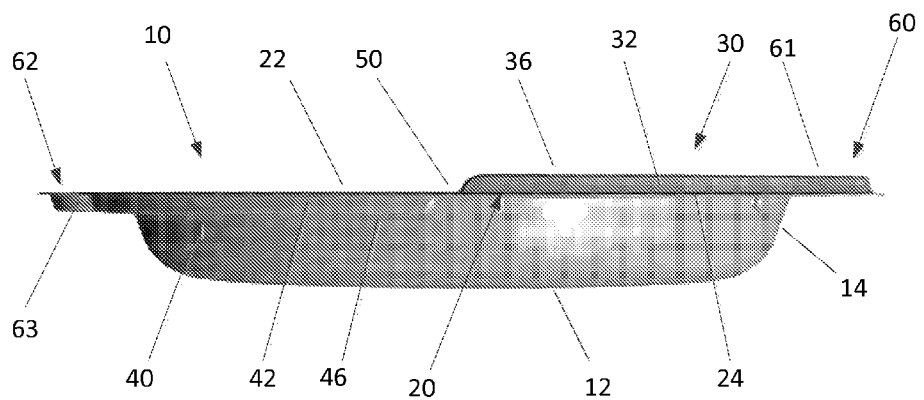
FIG. 2 is a side view of the stackable member of FIG. 1.

The drawings show a stackable member 10. The stackable member 10 may be used as a serving tray or plate. The stackable member 10 may also be used as a base or cover of a food container. The stackable member 10 includes a base 12 and a continuous sidewall 14. The base 12 and stackable member 14 cooperate to form a food storage area or cavity 16.

Figure 3:
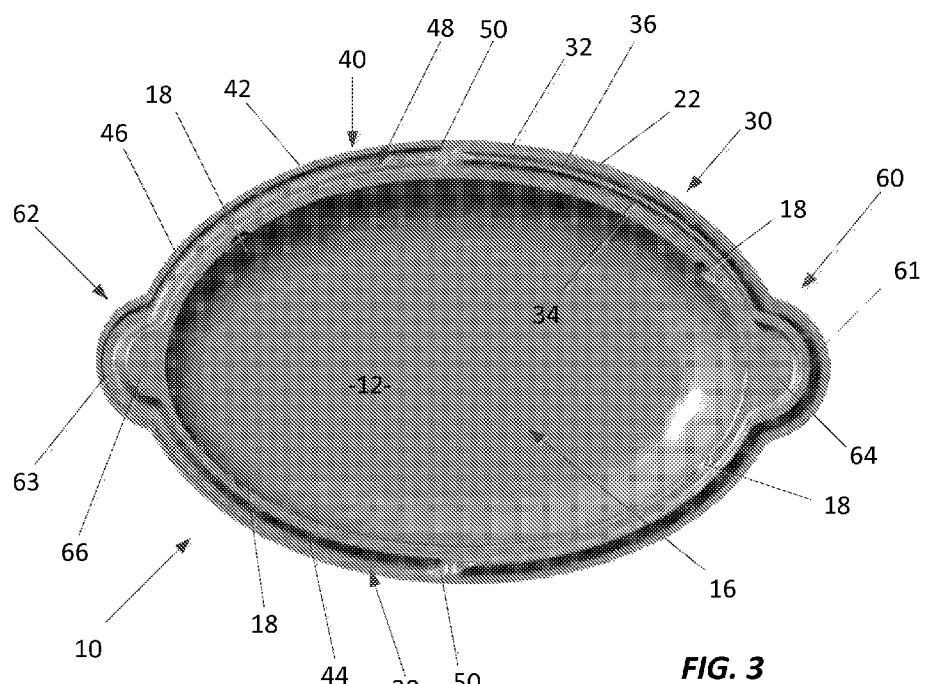
FIG. 3 is a top plan view of the stackable member shown in FIG. 1.

Projecting outwardly from the continuous sidewall 14 is a continuous locking ledge 20. The continuous locking ledge 20 has a top 22 and a bottom 24. As best illustrated in FIGS. 1 and 3, the inner surface of sidewall 14 includes a plurality of recesses 18 extending from the locking ledge 20 toward the base 12. Recesses 18 make it easier to disassemble a stack of stackable members 10.

Figure 4:
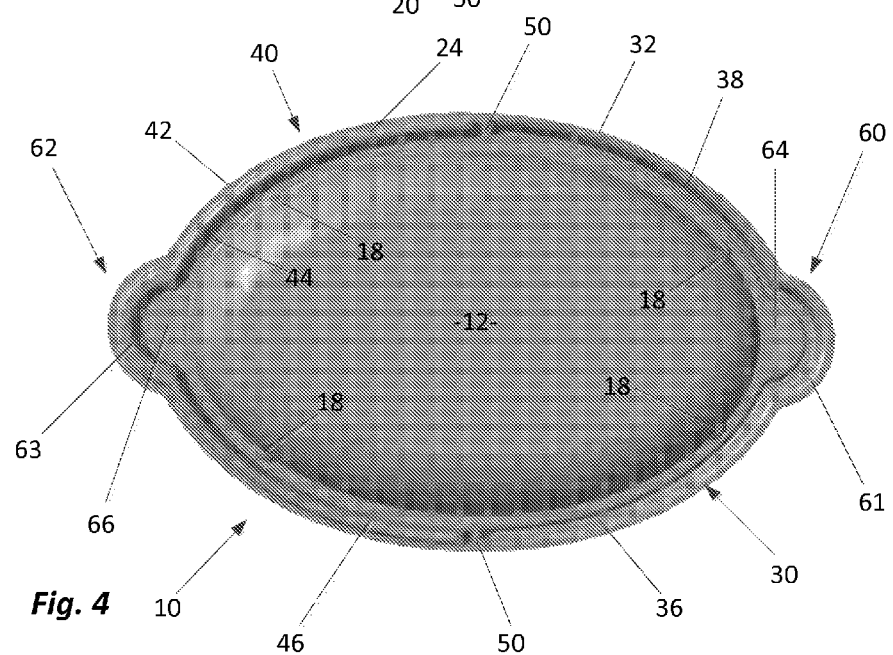
FIG. 4 is a bottom plan view of the stackable member shown in FIG. 1.

Extending away from the top 22 of the locking ledge 20 is a first bead 30. Bead 30 comprises a first wall 32, a second wall 34 and a cap 36 which cooperate and define a hollow open bottom recess 38. The hollow open bottom recess 38 is accessible from the bottom 24 of locking ledge 20 as shown in FIG. 4. Extending away from the bottom 24 of the locking ledge 20 is a second bead 40. Bead 40 comprises a first wall 42, a second wall 44 and a cap 46 which cooperate to define a hollow open top recess 48. The hollow open top recess 48 is accessible from the top 22 of locking ledge 20 as best shown in FIGS. 1 and 3.

The first locking bead 30 is elongate and extends approximately half the distance around the stackable member 10. Likewise, the second bead 40 is elongate and extends about half the distance around the stackable member in the opposite direction. The beads 30 and 40 are separated from each other by a pair of short transition portions 50 of the locking ledge 20.

Figure 8:
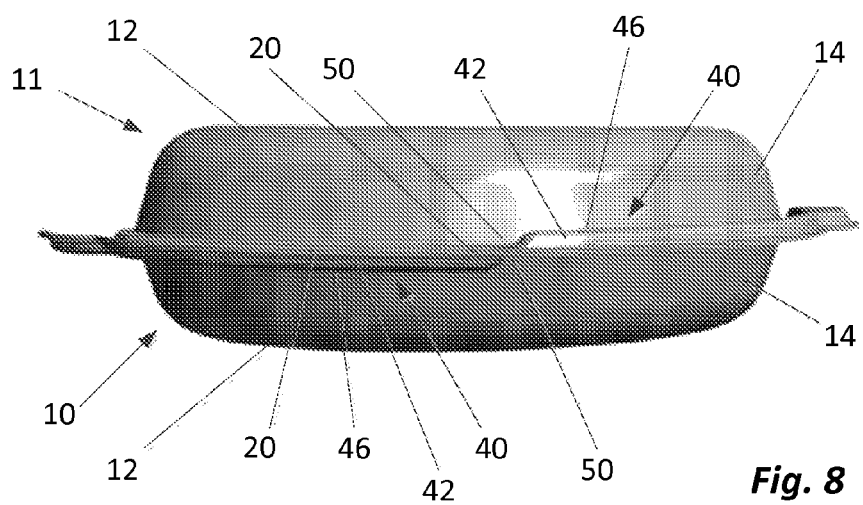
FIG. 8 is a side view of the arrangement shown in FIG. 6.

The continuous locking ledge 20 has a pair of ear portions 60 and 62. A portion 61 of the first bead 30 projects away from the top of ear portion 60 of locking ledge 20. A portion 63 of the bead 40 projects away from the bottom of ear portion 62 of locking ledge 20. As shown in FIG. 8, first ear portion 60 may be provided with a locking recess 64 and the second ear portion 62 may be provided with a locking tab 66.

Figure 5:
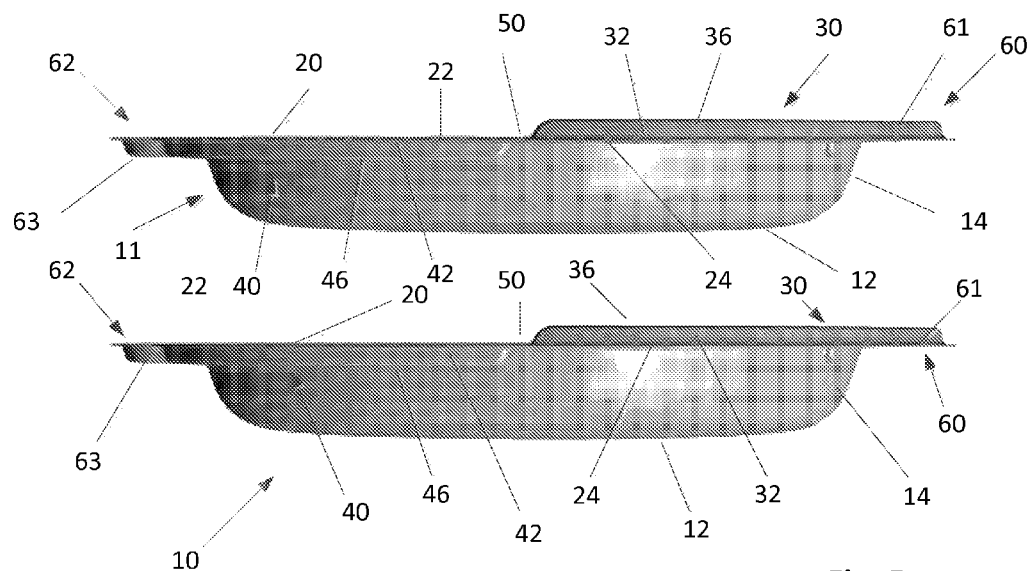
FIG. 5 shows a plurality of stackable members of the type shown in FIG. 1 oriented to be placed in the stacked configuration.

A plurality of stackable members 10 and 11 may be stacked as shown in FIG. 5. When stacked as illustrated, the stackable members are nested so that the base 12 of the second stackable member 11 is within the foods storage area of the first stackable member 10. Also, the first locking bead 30 of the first stackable member 10 is mated with the hollow open bottom recess of the second stackable member 11 and the hollow open top recess of the first stackable member 10 is mated with the second locking bead 40 of the second stackable member 11. When locking tabs 66 and locking recesses 64 are provided, they should likewise be shaped and sized to enable such nesting of stackable members 10 and 11 as illustrated.

Figure 6:
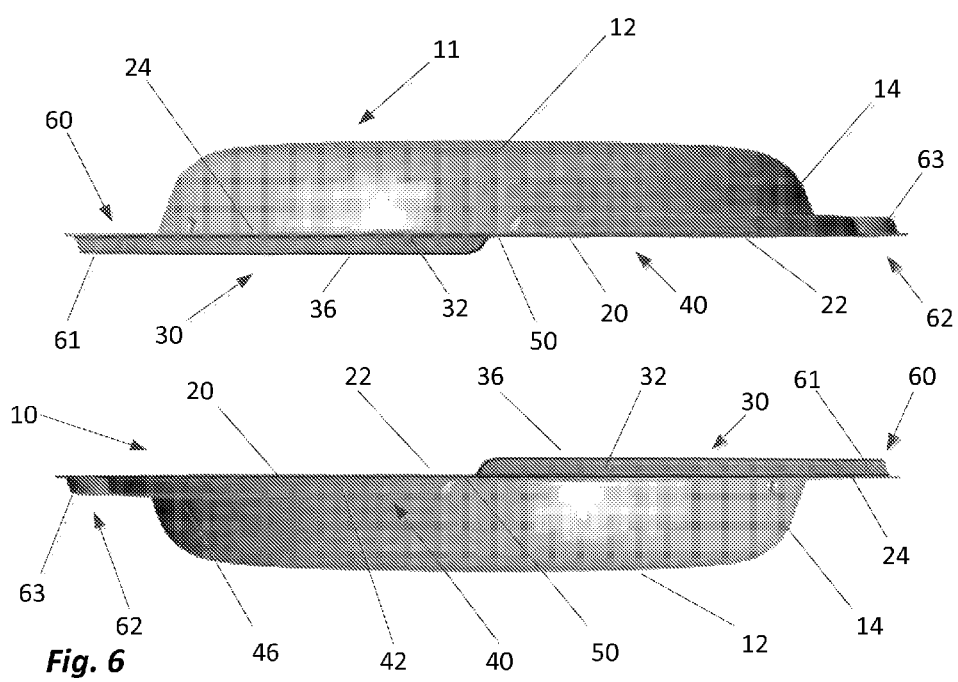
FIG. 6 shows first and second stackable members of the type shown in FIG. 1 oriented to be placed in a food containment configuration.
Figure 7:
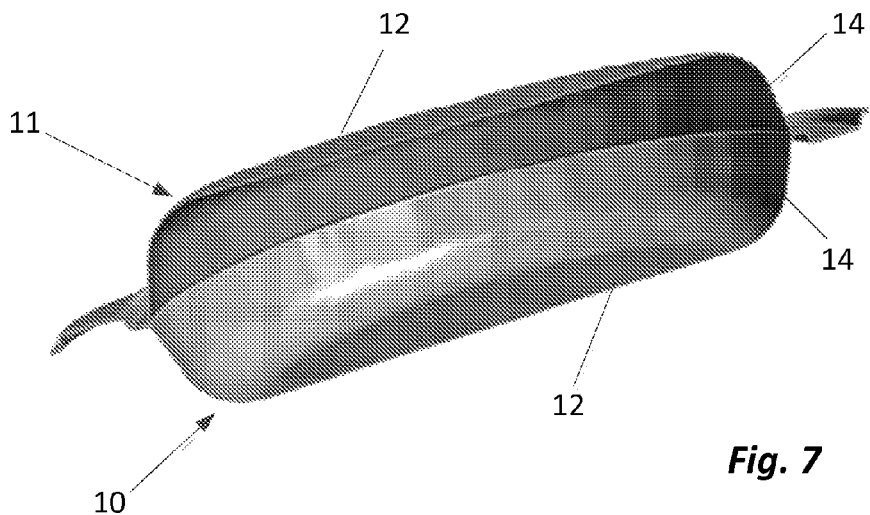
FIG. 7 is a perspective view showing first and second stackable members joined together in a food containment configuration.

To create a closed container for food, two stackable members (e.g. 10 and 11) are employed as illustrated in FIGS. 6-8. When the first stackable member 10 and the second stackable member 11 are in this food containment configuration, a food storage chamber is formed, through a cooperation of the bases 12 and sidewalls 14, by the food storage areas 16 of the stackable members 10 and 11. To secure the first stackable member 10 and the second stackable member 11 as shown in FIGS. 6 and 7, the first locking bead 30 of the first stackable member 10 is mated with the hollow open top recess of the second stackable member 11 and the hollow open top recess of the first stackable member 10 is mated with the first locking bead 30 of the second stackable member 11.

As should be clear from the foregoing, each stackable member (e.g. 10 and 11) is of the same size and shape. In fact, they are ideally identical in all respects. This reduces molding, tooling and manufacturing costs. Likewise, sellers and users of such containers need only stock a quantity of a single part rather than multiple parts.

The foregoing design makes it practical to manufacture the stackable members 10 and 11 from all natural, fibrous materials, such as bamboo, wheat straw, bagasse or the like. Recycled paper, which itself is made from fibrous natural material and therefore is a source of such material, may also be used to manufacture the stackable members. Whichever fibrous raw material is chosen, it is used to create a fibrous pulp. The pulp is then injected into a mold which is subjected to pressures in the range of 15 to 20 tons and temperatures in the range of 350° F. A vacuum is applied to remove moisture as the temperature and pressure of the mold dry and cook the pulp material. The stackable member is then removed from the mold and finished by cutting and trimming. Certain molding equipment which may be employed operates to cut and trim the tray in the mold itself such that no secondary trimming needed.

The mold employed may be highly polished in the areas used to create the inner surfaces of the base 12 and the sidewall 14. This results in these food contact areas being very smooth which offers several advantages. First, these smooth areas make it easier to unstack the stackable members. Unstacking is further assisted by the recesses 18 in the inner surfaces of the sidewall. These recesses 18 enable any vacuum existing between two stackable members (e.g. 10 and 11) to be relieved. The smooth surfaces also make it easy to remove sticky foods from the container and prevent fibers from the container from being entrained in the food. This also limits the porosity of the container which may be reduced further in incorporating within the slurry various additives. Many suitable additives have been approved by the U.S. Food and Drug Administration. Some additives are plant starch-based products which do not interfere substantially with the biodegradability of the stackable members.

In addition to being compostable, biodegradable, made from renewable or recyclable resources and otherwise being environmentally friendly, containers made as described above are microwavable, i.e., such containers are not readily damaged or destroyed by microwave energy during normal food cooking operations and do not cause arcing or sparking when subjected to microwave energy as so other types of food containers and utensils. The containers are also relatively microwave transparent such that microwave energy is transmitted through the container for even cooking of food products in the container. Also, such containers may be safely employed to heat food in conventional ovens. The containers may subjected to temperatures typically employed to heat or cook food and can easily withstand temperatures of at least 425° F. without substantial damage to the container, the oven or the food being heated or cooked therein.

While the food contacting surfaces are rendered smooth, other surfaces, and particularly those used to lock stackable members together in the food containment configuration illustrated in FIGS. 6-8, are left rougher to increase friction between those surfaces. For example, the outer surfaces of the beads 30 and 40 and surfaces defining the recesses 38 and 48 are left rougher.

Figure 9:
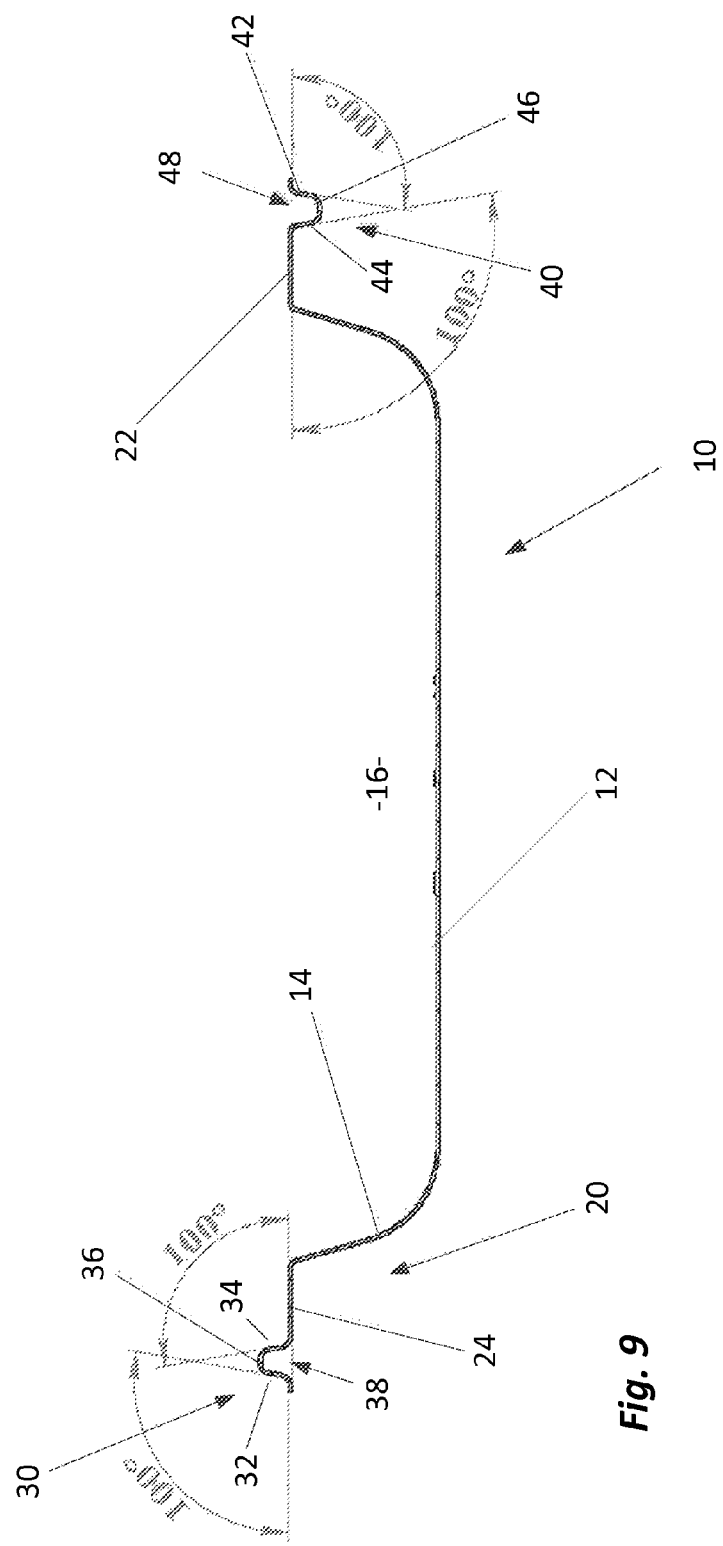
FIG. 9 is a cross-sectional view illustrating the draft of the walls of the locking beads.

Frictional engagement between the outer surfaces of the beads 30 and 40 of a first stackable member 10 and the mating recesses 38 and 48 of the second stackable member 11 may also be increased by providing an appropriate draft. The draft should typically be less than about ten degrees. A draft of less than 5% is even more preferable. In FIG. 9, a ten degree draft (102-90) is illustrated. When additional locking forces are desired to ensure the first and second stackable members 10 and 11 do not separate, locking tabs 66 and locking recesses 64 such as those shown in FIG. 3 may be provided. The locking tab 66 of the first stackable member 10 will engage the locking recess 64 of the second stackable member 11 and the locking tab 66 of the second stackable member 11 will engage the locking recess 64 of the first stackable member 10. As illustrated, the locking tabs 66 are defined by the top of the continuous locking ledge 20 and a wall 42 of the second locking bead 40. Also, the locking recesses 64 are defined by the top of the continuous locking ledge 20 and wall 32 of locking bead 30. Other tabs and recesses (e.g. the tabs and recesses used in standard egg cartons) may be employed without deviating from the invention.

The design principles discussed above may be employed to create stackable members having other shapes without deviating from the invention. While the drawings illustrate the stackable members as having a generally oval shape, a round, rectangular or square shape may be employed. In fact, essentially any geometric shape may be employed without deviating from the invention. Also, while the two elongate beads 30 and 40 are shown, a larger number of beads may be employed. What is important is that the first and second stackable members 10 and 11 are identical in shape and the beads and recesses of stackable member 10 cooperate with the beads and recesses of stackable member 11 to permit stacking as illustrated in FIG. 5 and to retain the stackable members 10 and 11 together in a food containment configuration as illustrated in FIGS. 6-8. Still other modifications may be made without deviation from the invention.

I claim:

1. A food service container having a stacked configuration and a food containment configuration, the container comprising:
   a. A first stackable member made from a fibrous natural material,
   b. A second stackable member identical to the first stackable member;
   c. The first stackable member and the second stackable member each comprising:
      i. A substantially flat base having a smooth inner surface;
      ii. A continuous side wall, having a smooth inner surface, projecting from the base and forming with the base a food storage area;
      iii. a continuous locking ledge projecting outwardly from the continuous side wall, the continuous locking ledge having a top and a bottom;
      iv. a plurality of recesses in the continuous side wall extending (i) from the continuous locking ledge toward the base and (ii) less than 25% of the distance from the continuous locking ledge to the base;
      v. a first locking bead projecting in a direction away from the top of the continuous locking ledge, the first locking bead defining a hollow open bottom recess accessible from the bottom of the continuous locking ledge;
      vi. a second locking bead projection in a direction away from the bottom of the continuous locking ledge, the second locking bead defining a hollow open top recess accessible from the top of the continuous locking ledge;
   d. Wherein when the first stackable member and the second stackable member are in the stacked configuration, the base of the second stackable member is within the recess of the first stackable member, the first locking bead of the first stackable member is mated with the hollow open bottom recess of the second stackable member and the hollow open top recess of the first stackable member is mated with the second locking bead of the second stackable member; and
   e. Wherein when first and second stackable members are in their food containment configuration, the bases and sidewalls of the first and second stackable members cooperate to form a food containment chamber, the first locking bead of the first stackable member is mated with the hollow open top recess of the second stackable member and the hollow open top recess of the first stackable member is mated with the first locking bead of the second stackable member.

2. The food service container of claim 1 wherein the first locking bead and the second locking bead each comprise a pair of walls and a cap, each wall of the pair of walls separated from each other and extending between the continuous locking ledge and the cap.

3. The food service container of claim 2 wherein each wall of the pair of walls of the first and second locking beads have a draft of less than about ten degrees.

4. The food service container of claim 2 wherein each wall of the pair of walls of the first and second locking beads have a draft of less than about five degrees.

5. The food service container of claim 1 wherein the continuous locking ledge has first and second ear portions.

6. The food service container of claim 5 wherein a portion of the first locking bead projects in a direction away from the top of the first ear portion of the continuous locking ledge and a portion of the second locking bead projects in a direction away from the bottom of the second ear portion of the continuous locking ledge.

7. The food service container of claim 5 wherein the first ear includes a locking recess and the second ear includes a locking tab.

8. The food service container of claim 7 wherein the locking recess is defined by the top of the continuous locking ledge and a wall of the first locking bead and the locking tab is defined by the top of the continuous locking ledge and a wall of the second locking bead.

9. The food service container of claim 6 wherein the locking bead of the first stackable member mates with the locking recess of the second stackable container and the locking recess of the first stackable container mates with the locking bead of the second stackable member when the first and second stackable members are in the food containment configuration.

10. The food service container of claim 1 wherein the fibrous natural material is selected from the group consisting of bamboo, wheat straw and bagasse.

11. The food service container of claim 1 wherein the source of fibrous natural material is recycled paper.

12. The food service container of claim 1 wherein the container is microwavable.

13. The food service container of claim 1 wherein the container withstands temperatures in a conventional oven of at least 425° F.

* * * * *